Aug. 21, 1956     E. V. GARNETT     2,759,682
CABLE REEL TRAILERS
Filed Jan. 21, 1954     2 Sheets-Sheet 1
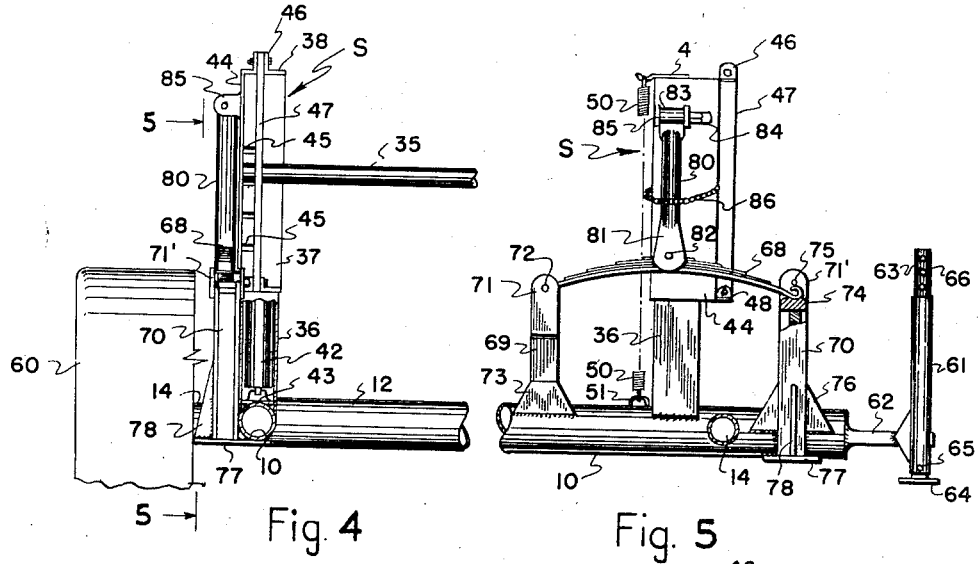
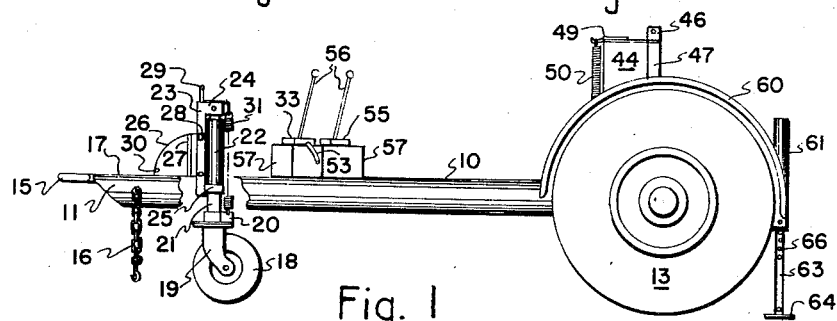
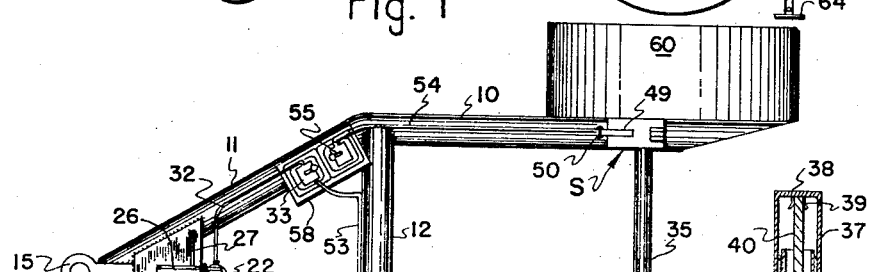
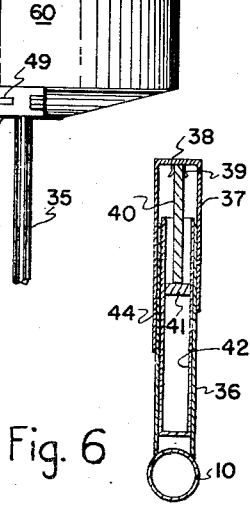
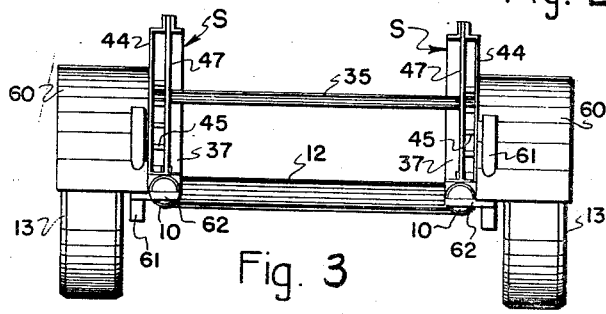
INVENTOR.
Edward V. Garnett
BY Horace B. Van Valkenburgh
ATTORNEY

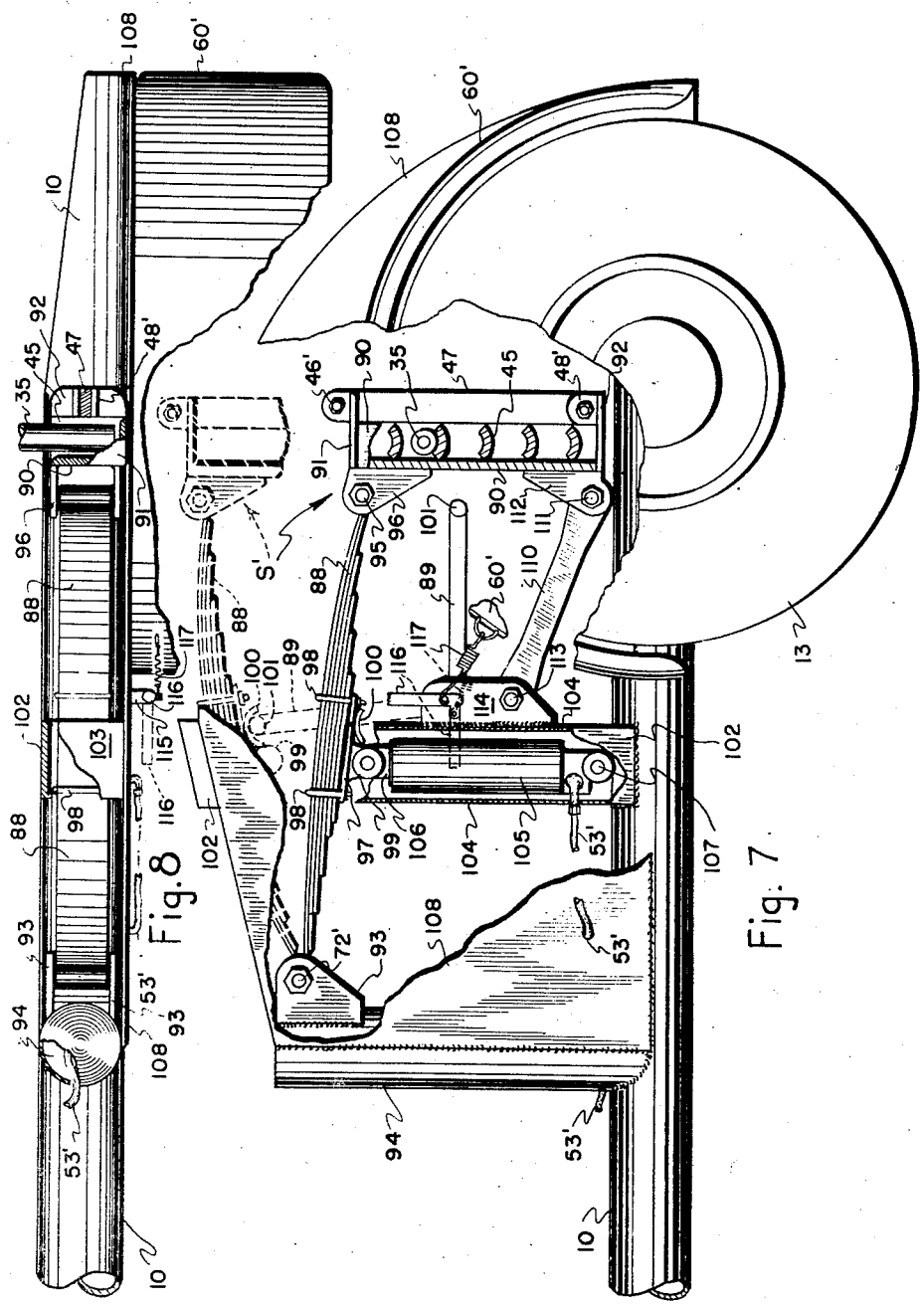

United States Patent Office 2,759,682
Patented Aug. 21, 1956

2,759,682

CABLE REEL TRAILERS

Edward V. Garnett, Denver, Colo., assignor to Truck Equipment Company, Denver, Colo., a corporation of Colorado Application January 21, 1954, Serial No. 405,349

15 Claims. (Cl. 242—90)

This invention relates to trailers, and more particularly to trailers for the transportation and use of reels carrying cable or the like, such as electrical transmission cable, telephone transmission cable, and others.

Reels for carrying cable and the like generally comprise a drum having an annular flange at each side, made from metal, or the drums and flanges sometimes being made from wood with metal reinforcements at the center to engage a shaft. By supporting the shaft and reel in horizontal position, the reel may be turned to unwind the cable therefrom. When a wheeled trailer is provided, for transporting the reel to and from one or more places of use, the ends of the shaft may be placed in lifts or supports which are elevated, as by jacks, to a position in which the reel clears the ground, after which the trailer may be moved to a desired point. Such reels, when loaded, usually weigh a considerable amount, such as up to five tons, and the weight of the reels tends to produce relatively high stresses in supporting parts, while jolts and jars during transportation produce additional stresses which tend to bend the shaft or bar on which the reel is mounted and also may stress supporting parts beyond safe limits. Needless to say, if the shaft or bar on which the reel is mounted has been bent, it is difficult and may often be virtually impossible to turn the reel easily, in order to unroll the cable from the reel. Furthermore, a deflection or failure of a supporting part, or a bending of the reel shaft, may permit the reel and cable to strike the ground, and when this occurs while the trailer is being moved from one point to another, the reel and possibly sections of the cable itself may be damaged.

Among the objects of the present invention are to provide a novel trailer for cable reels; to provide such a trailer in which the reel may be moved readily to any desired position, and may be readily maintained in such position; to provide such a trailer in which sudden jars or jolts do not tend to unduly stress the supporting parts for a shaft or bar on which a loaded reel may be mounted; to provide such a trailer in which hydraulic equipment may be utilized to raise or lower a loaded reel, but need not sustain the load during transportation; to provide such a trailer which may exist in more than one form; and to provide such a trailer in which each such form is readily constructed and effective in operation.

Additional objects and the novel features of this invention will become apparent from the description which follows, taken in connection with the accompanying drawings, in which:

Fig. 1 is a side elevation of a trailer, constructed in accordance with this invention and forming one embodiment thereof, certain parts being broken away to show hidden parts more clearly;

Fig. 2 is a partial top plan view of the trailer of Fig. 1;

Fig. 3 is a rear elevation of the trailer of Fig. 1;

Fig. 4 is a rear elevation on an enlarged scale of a portion of the trailer of Fig. 1, with certain parts in section to show the interior construction thereof more clearly;

Fig. 5 is a longitudinal vertical section, taken along line 5—5 of Fig. 4;

Fig. 6 is a vertical section of a hydraulic lift arrangement, shown partly in vertical section in Fig. 4;

Fig. 7 is a side elevation of the rear portion of a trailer constructed in accordance with this invention and forming a further embodiment thereof, with certain parts broken away to show the interior construction more clearly; and Fig. 8 is a fragmentary top plan view of a portion of the trailed shown in Fig. 7.

As illustrated in Figs. 1–3, a trailer for cable reels and the like may comprise a framework formed principally of tubular members, such as heavy pipe, and including a pair of horizontal, longitudinal side rails 10, the front ends of which may extend inwardly to form angular rails 11 which are joined together at their front ends, as by welding. A brace 12 extends between the side rails 10, just rearwardly of the bends therein, while wheels 13 may be mounted on axles 14, shown in Figs. 4 and 5, on the outside of side rails 10. Each wheel 13 may include appropriate bearings, a brake drum and brake, and a hub on which may be mounted a pneumatic tire, the wheels being conveniently of the type utilized for heavy-duty trucks. At the front end of the trailer, an eye 15 by which the trailer may be attached to a truck or other vehicle for pulling the same, is attached, as by welding, to the front ends of the angle rails 11, while a safety chain 16 may be attached to the front end, on each side, in a convenient position. A plate 17, which extends across the angular rails 11 adjacent the front end thereof, and may be welded thereto, provides support for a front wheel assembly which includes a wheel 18, smaller than the rear wheels 13 but preferably having a pneumatic tire and mounted for rotation in a fork 19 which, in turn, is mounted for pivotal movement on the underside of a bracket 20. The latter is attached to the lower end of a hydraulic tube 21 received in a cylinder 22, which is mounted on a bracket 23, being connected at its upper end to an upper flange 24 of the bracket and attached to the lower end of the bracket by a collar 25. In turn, bracket 23 is pivoted adjacent collar 25 between a pair of arcuate plates 26, in turn welded to platform plate 17 and reinforced by gussets 27. The bracket 23 is movable between the plates 26, from the vertical position in which a pin 28, normally engaging corresponding slots in plates 26 and held in down position by a spring (not shown) may be moved upwardly by a handle 29, so that the front wheel assembly may be pivoted forwardly at the upper end, to a horizontal position, in which pin 28 engages a slot 30 in each of the plates 26. This places the front wheel assembly entirely above the framework, in a position completely out of the way, which is particularly useful during transportation. A coil spring 31, which extends between upper flange 24 of bracket 23 and the lower bracket 20, tends to pull the upper wheel 18 upwardly, so that it will not drop down unless forced downwardly by hydraulic pressure which may be supplied through a hydraulic line 32 from a pump 33. As will be evident, when the trailer has been transported to a point of use of the cable, the front wheel assembly may be pivoted to a vertical position, and the front wheel then forced downwardly, by hydraulic pressure, until the front end of the trailer is supported by the wheel 18 and the eye 15 may be detached from the vehicle towing the trailer.

The space between the side rails 10 and transverse brace 12 is sufficient to accommodate a reel of the largest size expected to be mounted on the trailer, the reel being supported on a shaft or bar 35 which extends between a pair of supports S mounted on the side rails 10 adjacent the rear wheel axles, such as slightly forwardly thereof, as shown, or slightly rearwardly thereof, depending upon the desired distribution of the load. Each support S, as in Fig. 6, may include an inner box 36, square or rectangular in cross-section and extending upwardly from and mounted in fixed position on the respective side rails 10, conveniently being welded thereto. Each inner box 36 is open at the top, and the upper end thereof is enclosed by an outer box 37, which is movable upwardly and downwardly and is open at the bottom and rectangular in cross-section to correspond to the inner box, either the inside of the outer box or outside of the inner box preferably being provided with thin strips of bearing material, such as Phosphor bronze, to reduce wear and friction when lubricated. The top 38 of the outer box may be provided on the underside with a clip 39 which receives the upper end of a piston rod 40, connected to a piston 41 received in a cylinder 42 and movable upwardly by hydraulic pressure within the cylinder. Cylinder 42 has a diameter corresponding to the transverse inner dimension of inner box 36 and is attached at its lower end, as in Fig. 4, to the side rail 10, by a bracket and pin connection 43, or in any other suitable manner, thus being held rigidly in fixed position.

One side 44 of outer box 37 preferably extends rearwardly from the inner box, to provide space for attachment, as by welding, of one end of each of a series of arcuate supports 45, which are adapted to receive the end of reel shaft 35 and which may also be welded to the rear side of box 37. Cap 38 of box 37 also preferably supports a bracket 46 to which a bar 47 may be removably attached, as by bolts, bar 47 being similarly removably attached to a bracket 48 at the lower end of box 37, and may be disconnected at one end and swung upwardly or downwardly, as the case may be, while the end of reel shaft 35 is placed on one of the supports 45. Then, the bar 47 may be fixed in position, to hold the reel shaft securely in the desired support. To maintain the supports 45 in down position, unless moved upwardly by hydraulic pressure supplied to cylinder 42, a hook 49 may be mounted on the rear upper end of box 37 for attachment of the upper end of a coil spring 50, the lower end of spring 50 conveniently being attached to an eye 51, welded or otherwise attached to side rail 10.

As will be evident, with the supports in the down position of Fig. 3, when hydraulic pressure is supplied to each support S, both ends of the reel shaft 35, with the reel on it, will be elevated, such as to a position slightly above that shown in Figs. 4 and 5. Hydraulic fluid may be supplied by suitable means, as by a line 53 from pump 33 to the cylinder 42 of one support S, and a line 54 from a second pump 55 to the other support S, line 54 conveniently extending along one side rail 10 and line 53 conveniently extending along brace 12 and the opposite side rail 10, to the respective supports and connected to the cylinders therein. Pumps 33 and 55 are each provided with a handle 56, as in Fig. 1, for producing hydraulic pressure, and each is mounted atop a reservoir 57, in turn mounted on a platform plate 58 which is welded or otherwise suitably secured to an angule rail 11 and may also be partly supported by brace 12, as in Fig. 2. The pumps 33 and 55 are provided with conventional valves (not shown) for connecting line 54 with pump 55 and lines 32 and 53 individually with pump 33, as well as to connect the respective lines with the reservoirs 57. Front wheel 18 may be pushed to the ground and the front end then elevated, by operation of pump 33, and the hydraulic fluid drained back into the reservoir when the front wheel is to be retracted. Similarly, supports S may be elevated by operation of pumps 33 and 55, either simultaneously or individually to level the reels when the trailer is resting on uneven ground, handles 56 being placed close together to permit simultaneous or individual operation by one person. When the supports S are to be lowered, the hydraulic fluid is merely drained back into the reservoirs 57, springs 50 forcing the supports down when there is no load thereon, and spring 31 performing a similar function for front wheel 18.

Each rear wheel may be partially enclosed by a fender 60, having an inside skirt by which the fender may be attached to the side rail 10. In addition, for stabilizing the frame when a reel is being loaded or unloaded, a mechanical support may be mounted on the rear end of each rail 10, as shown more clearly in Fig. 5. Such a support may include a fixed tube 61, attached by means of a bracket 62 to the rear end of the rail 10, and a movable tube 63 provided with a footing 64. Fixed tube 61 may be provided with a hole through which a pin 65 may be slipped, to engage one of a series of holes 66 in movable tube 63, so as to maintain the tube 63 in any desired position relative to tube 61, such as the up position of Fig. 5 or the down position of Fig. 1. Bracket 62 may extend outwardly, so that tube 61 may be placed in a position which will not interfere with loading, unloading or unreeling operations, and each tube 61 therefore may extend through a fender 60, as in Fig. 3.

In accordance with the present invention, the reel and reel shaft 35 and the supporting parts associated therewith, such as including the box 37 and supports 45, may be supported in an elevated position, particularly during transportation, by a heavy leaf spring 68, shown in Figs. 4 and 5. Leaf spring 68 is supported by a front standard 69 and a rear standard 70, each conveniently formed primarily from an I-beam and attached at its lower end to a side rail 10, as by welding. A pair of plates 71 may be welded to the upper end of the I-beam 69, to support a pin 72 around which the coiled front end of the lower leaf of spring 68 extends, while a gusset 73 may be welded to the I-beam and to the rail 10 to provide additional stability for the front standard 69. Similarly, a pair of plates 71' may be welded to the upper end of the rear I-beam 70, to enclose laterally the rear end of the leaf spring 68, the rear end of the spring being supported by a pad or block 74 having a curved upper surface to facilitate movement of the rear end of the spring thereover during flexure. Pad 74 rests directly on the upper end of the I-beam 70 and also may be welded thereto and to the plates 71'. In addition, a pin 75 may extend between plates 71' to prevent upward movement of the spring. Rear standard or I-beam 70 may be reinforced by gussets 76 welded to the front flange thereof and to the rail 10, and by a plate 77 welded to the under side of rail 10 and to the under side of I-beam 70, with a triangular gusset 78 being welded to the other flange of I-beam 70 and to plate 77, for additional lateral stability. The position of the rear I-beam 70 at the outside of the rail 10 provides additional space at the rear for access to the reel and the reel shaft 35.

The load from the supports 45 and outer box 37 of each support S may be carried to the leaf spring 68 by an arm 80, which may conveniently be formed from tubular stock which is split and flattened at the lower end to form flanges 81, between which a pin 82 extends to engage the leaf spring. Arm 80 may also be flattened at its upper end and shaped to provide a hinge 83, which is connected by a pin 84 to a bracket 85, in turn permanently attached to the outer plate 44 of the outer box 37. A retaining chain 86, detachable at one end or at both ends, may be looped around the arm 80 when in spring-engaging position, and also hold arm 80 in an upper position, when not in use, since when the arms 80 are not in use, each may be swung upwardly about pin 84, in which position they will not interfere with raising or lowering of the supports S. To permit the reel to be supported by an arm 80 and a spring 68 at each side, each support S is raised until the lower ends of flanges 81 will clear the top of each spring and each arm 80 is then swung around and downwardly to a point above the spring, after which each support is lowered until pin 82 engages the top of the spring at each side. As the support is lowered and the load comes on the spring 68, each spring will, of course, be pushed downwardly, the rear end sliding on pad 74, until the entire load is taken by the spring. Then the chain 86 may be fastened around the arm 80.

In the form of this invention illustrated in Figs. 7 and 8, a frame which includes side rails 10, may be similar to that illustrated in Figs. 1–3, while the rear wheels 13 may be similarly attached to the frame by laterally extending axles, as before. In addition, a front wheel and hydraulic pumps and reservoirs may be mounted on the frame, in the manner described previously. In the embodiment of Figs. 7 and 8, a support S' is attached to the rear end of and supported by a leaf spring 88, at each side of the trailer, and the load of the reel and shaft 35 is carried by these leaf springs at all times. However, the supports S' may be moved upwardly and downwardly hydraulically, while springs 88 and supports S' may be maintained in an upper position, i. e., the dotted position of Fig. 7, by a supporting bar 89, which may be shifted from the lower or full to the upper or dotted position of Fig. 7, for such purpose. Thus, when the supports S' are moved to the upper positions and the supporting bars 89 also moved to the upper positions of Fig. 7, pressure of hydraulic fluid to device H may be discontinued. This insures that the load will be transmitted from the spring directly to the frame, without subjecting the hydraulic mechanism to road shocks during transportation, and the hydraulic parts may thus be smaller and less expensive, since a static rather than a dynamic load need be supported by them.

Each supporting device S' may comprise a series of arcuate supports 45, disposed in spaced vertical relationship and welded at their front edges and outer ends to an angle 90, to the upper end of which an upper cap 91 may be welded and the lower end of which a lower cap 92 may be welded. The upper cap is provided with a bracket 46' and the lower cap with a bracket 48', for removable attachment of a bar 47, as by bolts, to lock the shaft 35 in the supports S', in the manner described previously. The front end of each spring 88 is pivotally mounted, as by a pin 72' extending between bracket plates 93 which are welded to a tubular column or standard 94, in turn mounted on and welded on its lower end to side rail 10, while the rear end of each spring 88 is pivotally attached, as by a pin 95, to bracket plates 96 welded to the rear side of angle 90 at the upper end of the latter. A spring clamp plate 97 is attached by U-bolts 98 to the center of the leaves of spring 88, and is provided on its underside with a trunnion 99 and an arcuate stop 100, the latter being adapted to be engaged by a relatively heavy, short rod 101 welded to the outer end of bar 89. During upward and downward movement, the center of the spring 88 is guided between side plates 102 which are welded at their lower ends to the side rail 10 and closed at their upper ends by a cap 103. The space between side plates 102, below the lowest position of spring 88, is closed at the front and rear by plates 104, thereby forming a column which not only provides a guide for spring 88, but also provides an enclosure for a hydraulic lift which may consist of a cylinder 105 and a piston 106, the former being pivoted at its lower end to side rail 10 by a pin and bracket connection 107 and the latter being pivotally attached at its upper end to trunnion 98. The hydraulic line 53', leading from a pump and reservoir, as in the manner previously described, may extend to and along the side rail 10 through the tubular column 94, then out through a skirt 108 which is attached along its front edge to column 94 and along its bottom edge to rail 10 and extends alongside and above fender 60', which partially encloses rear wheel 13. Hydraulic line 53' then extends inwardly through skirt 108 and through the front plate 102, to the cylinder 105. The hydraulic lift is actuated in a conventional manner, i. e., through hydraulic fluid pumped through the hydraulic line 53' to the cylinder 105 for lifting, and drained back through line 53' for lowering.

The support S' is maintained in vertical position at all times by a link 110 which is pivotally attached at its rear end to the lower end of support S', as through a pin 111 extending between bracket plates 112 welded to the front leg of angle 90, and is pivotally mounted at its front end, as on a pin 133 extending between a pair of bracket plates 114 welded to the rear plate 104. As will be evident, as spring 88 moves upwardly, the pins 95 and 111 will be maintained in vertical relationship by link 110, so that support S' will always remain vertical. Plates 114 also provide a pivotal support for the bar 89, which is welded at its front end to a pivot rod 115, the latter extending through suitable holes in plates 114 and being upturned at its outer end, outside skirt 108 to form a handle 116, which may be moved between the full and dotted positions of Figs. 7 and 8, to move the bar 89 from the lower or rear position to the dotted, or upright, supporting position of Fig. 7. Bar 89 is normally maintained in a down position, as by a spring 117 which extends between handle 116 and fender 60', the spring 117 preferably being attached to handle 116 at a point such that it will act as a toggle spring. That is, in the full position of Fig. 7, the pull of spring 117 will be above the axis of rod 115, to maintain the rod 84 in its down position, but when the handle is swung from the full to the dotted positions, the pull of the spring 117 on the handle 116 will then be slightly below the axis of rod 115, thereby tending to hold bar 89 in its upper position.

When a reel is to be mounted on the trailer of Figs. 7 and 8, the supports S' may be lowered to the full position of Fig. 7, whereupon the reel may be rolled or otherwise moved between the side rails 10, until the reel shaft 35 is positioned between two of the supports 45. Then hydraulic fluid may be supplied to the cylinders 105, at each side, until the supports S' are moved to a position slightly above the dotted position of Fig. 7. Then, the bar 89 may be swung upwardly to the dotted position, by movement of handle 116 from the full to the dotted positions, so that the rod 101 will engage the stop 100 upon release of hydraulic pressure, and the spring 88 will then be supported at its center by the bar 89. The trailer may then be transported to a point of use of the reel and supports S may remain in elevated position if the trailer rests on a level spot, but if leveling of the ends of shaft 35 is necessary, the hydraulic cylinders 105 may be appropriately utilized.

From the foregoing, it will be evident that the cable reel trailer of this invention fulfills to a marked degree the requirements and objects hereinbefore set forth. As will be evident, by the use of separately operable hydraulic devices, one connected with a reel shaft support at each side of the trailer, the reel may be moved readily to any desired vertical position and the elevation of each end of the shaft may be adjusted independently. Due to the support of the reel by a heavy spring, preferably a leaf spring, the extremely heavy weight of a loaded reel, which tends to produce heavy impact forces during travel of the trailer over rough roads or other surfaces, such impacts tend to be absorbed by the springs and do not tend to overstress either the supporting parts or the reel shaft. Thus, the loaded reel may move upwardly and downwardly during passage of the trailer over rough spots, without harmful effect.

As will also be evident, each of the embodiments illustrated are readily constructed by cutting and welding tubular or flat stock with few problems in assembly. The thickness of material used is preferably chosen so that adequate strength is obtained, but undue weight is avoided. For instance, to support a 5-ton reel, the supports S and S' may provide a clearance of 50 inches between them, with the rear edge of brace 12 about 46 inches from the center line of the shaft 35 when in the supports S or S'. The side rails 10 and brace 12 may be 5 inches o. d. heavy tubing, with other parts in proportion. The dimensions and thickness of material used may, of course, be varied in accordance with the maximum weight to be supported and the maximum size of reel to be accommodated. The hydraulic pumps, reservoirs, cylinders and piston assemblies, wheels and the like may be purchased as conventional parts.

Although two different embodiments of this invention have been illustrated and described, it will be understood that other embodiments may exist and various changes may be made therein, all without departing from the spirit and scope of this invention.

What is claimed is:

1. A trailer for cable reels and the like, comprising a wheeled frame providing a space for reception of said reel, said reel being normally mounted on a shaft; an upwardly and downwardly movable support at each side of said frame, said supports being provided with means for receiving the ends of said reel shaft; hydraulic means at each support for moving said support upwardly and downwardly; and a leaf spring at each said support, for resiliently maintaining said support in an upper position.

2. A trailer for cable reels and the like, as defined in claim 1, wherein each said support is connected to the end of a leaf spring and said hydraulic means is connected to said spring adjacent the center thereof.

3. A trailer for cable reels and the like, as defined in claim 1, wherein said hydraulic means is connected to each said support and each said support is connected to said spring.

4. A trailer for cable reels and the like, as defined in claim 3, including an arm pivotally mounted on each said support and engageable with said spring to transfer the load on said support to said spring.

5. A trailer for cable reels and the like, comprising a wheeled frame providing a space for reception of said reel, said reel being normally mounted on a shaft; an upwardly and downwardly movable support at each side of said frame, said supports being provided with means for receiving the ends of said reel shaft; a standard spaced longitudinally from each said support; a leaf spring at each said support, each said spring being pivotally connected to the corresponding standard at one end and pivotally connected at the opposite end to said support; hydraulic means connected to each said spring adjacent the center thereof, for moving said support upwardly and downwardly; a link pivotally connected to each said support in spaced relation to said spring; and fixed means on said frame for pivotally supporting the opposite end of each link.

6. A trailer for cable reels and the like, as defined in claim 5, wherein said hydraulic means is enclosed within said fixed means.

7. A trailer for cable reels and the like, as defined in claim 6, including an arm pivotally mounted on said fixed means and engageable with said spring to transfer the load on said spring to said frame.

8. A trailer for cable reels and the like, comprising a frame having side rails spaced apart to provide a space for reception of said reel, said reel being normally mounted on a shaft; hydraulic pump means mounted on said frame; an upwardly and downwardly movable support at each side of said frame, said supports being provided with means for receiving the ends of said reel shaft; hydraulic means at each support for moving said support upwardly and downwardly; hydraulic lines leading from said pump means to each said hydraulic means, at least a portion of each hydraulic line extending along a side rail; and a leaf spring at each said support, for resiliently maintaining said supports in an upper position.

9. A trailer for cable reels and the like, as defined in claim 8, wherein each said support is connected to the end of a leaf spring; said hydraulic means is connected to said spring adjacent the center thereof; a column is mounted on each side rail and encloses said hydraulic means, the upper end of said column forming a guide for said spring; and a link extends between each said column and the lower end of the corresponding support, said link being pivotally connected to said column and to said support.

10. A trailer for cable reels and the like, as defined in claim 9, including a bar for holding said spring in an upper position, said bar being pivoted on said column.

11. A trailer for cable reels and the like, as defined in claim 10, wherein said bar is movable between lower and upper positions; a handle for moving said bar is disposed outwardly from said column; and a toggle spring is attached to said handle for holding said bar in its respective positions.

12. A trailer for cable reels and the like, as defined in claim 8, wherein a support for the opposite ends of each said spring is disposed forwardly and rearwardly of said shaft support.

13. A trailer for cable reels and the like, as defined in claim 12, wherein each said spring is pivoted on one said spring support and is slidable on the other spring support.

14. A trailer for cable reels and the like, comprising a wheeled frame providing a space for reception of said reel, said reel being normally mounted on a shaft; an upwardly and downwardly movable support at each side of said frame, said supports being provided with means for receiving the ends of said reel shaft; hydraulic means at each support for moving said support upwardly and downwardly; and a spring at each said support, for resiliently maintaining said supports in an upper position.

15. A trailer for cable reels and the like, comprising a wheeled frame providing a space for reception of said reel, said reel being normally mounted on a shaft; an upwardly and downwardly movable support at each side of said frame, said supports being provided with means for receiving the ends of said reel shaft; hydraulic means at each support for moving said support upwardly and downwardly; a spring at each said support, for resiliently maintaining said supports in an upper positions; and means for transferring the load of said supports and said reel through said spring to said frame independently of said hydraulic means, when said supports and reel are moved to an upper position by said hydraulic means.

References Cited in the file of this patent

UNITED STATES PATENTS

| Number | Name | Date |
|---|---|---|
| 682,104 | Middleton | Sept. 3, 1901 |
| 1,832,446 | Boe | Nov. 17, 1931 |
| 1,939,055 | Johnson | Dec. 12, 1933 |